Patented Apr. 8, 1947

2,418,782

UNITED STATES PATENT OFFICE 2,418,782

METHOD OF PRODUCING A FREE-FLOWING HIGH SOLIDS AQUEOUS DISPERSION OF A BUTADIENE-STYRENE COPOLYMER

Jacob G. Mark and David Rubinstein, Brookline, Mass., assignors to Dewey and Almy Chemical Company, North Cambridge, Mass., a corporation of Massachusetts No Drawing. Application April 7, 1944, Serial No. 530,036

1 Claim. (Cl. 260—86.5)

The present invention relates to the manufacture of synthetic rubber and more particularly to an improvement in the process of polymerizing butadiene-styrene mixtures emulsified in water.

One of the problems in commercial scale production of rubber-like materials by polymerization of mixtures of styrene and butadiene-1,3 in emulsion form is brought about by the limitation placed on the amount of rubber solids which can be produced in a single run in given equipment by the practical necessity of keeping the solids content of the finished dispersion below a fixed limit. The viscosity of the dispersions varies to a large extent directly with the proportion of polymer solids present in the dispersion. When the proportion of monomer in the emulsion is increased to produce a proportion of solids above this limit, the viscosity of the completed dispersion is then so great that it is difficult or else impossible to remove the product from the reaction kettle or to handle it in subsequent processing. This is particularly so if the dispersion is cooled, as in the piping, because its viscosity increases enormously upon cooling. Also, in the case of these high monomer emulsions as heretofore prepared, the polymerization reaction progresses unsatisfactorily because of poor heat transfer to the reactor jacket, localized overheating and other effects due to high viscosity and monomer concentration and because of local coagulation. Generally, the practical upper limit of solids content has been about 45% solids.

Another difficulty encountered in the manufacture of synthetic rubber from aqueous emulsions of styrene and butadiene-1,3 is caused by the practical necessity of employing a fatty-acid soap or its equivalent in the charge for its beneficial effects in maintaining the emulsion and in activating the polymerization reaction. Heretofore, it has been necessary to include soap in the emulsion in amounts in the neighborhood of 5% of the weight of the monomer to secure satisfactory results. The free fatty acids or insoluble soaps carried over into the rubber coagulated from the completed dispersion are objectionable for various reasons and the treatments available for removing them are costly and time-consuming.

The present invention has as an object to provide an emulsion polymerization process by which stable aqueous dispersions of polymerized mixtures of butadiene-1,3 and styrene can be made having higher solids content than those produced by current processes. A further and related object is to provide a process which will produce high solids dispersions of the kind stated having viscosities which are comparatively low in relation to their solids content. Further objects are to provide a polymerization process in which fatty-acid soap or its equivalent need not be used, or if used, may be used in a substantially smaller amount than has been required in the past, and to provide an improved butadiene-styrene synthetic rubber.

In accordance with the invention it has been found that, by the addition of relatively small amounts of an addition agent comprising a water soluble formaldehyde condensation product of naphthalene sulfonic acid, aqueous emulsions of butadiene-styrene mixtures can be made and maintained under conditions bringing about polymerization of the monomers without the use of soap, or with the use of a substantially smaller amount of soap than otherwise would be required, and that such dispersions containing large proportions of polymer can be made to have a sufficiently low viscosity to permit removal from the reaction kettle with sufficient ease to satisfy commercial production requirements.

The addition agents which have been found useful in accordance with the invention are the materials formed by condensing a naphthalene sulfonic acid with formaldehyde, and the water soluble salts of these materials. The preferred material is the sodium salt of the products obtained by condensing formaldehyde and beta-naphthalene sulfonic acid. Other water soluble salts, notably the potassium and ammonium salts, and the free acid as well, are useful, but the sodium salt is preferred because of its low cost. These condensation products and methods for their preparation are disclosed in detail in U. S. Patent to Schmidt, No. 1,336,759, dated April 13, 1920.

In practicing the present invention, we prepare an emulsion of butadiene-1,3 and styrene in water, following customary procedure, with or without the employment of sodium oleate or its equivalent, and include in the batch a relatively small proportion of a water soluble formaldehyde condensation product of naphthalene sulfonic acid. The emulsion is formed and maintained by stirring, and when it has become uniform is subjected to polymerizing conditions. The subsequent steps in the process are conventional.

To more fully disclose the invention, the following examples are given. The viscosities given were measured on a Stormer type viscosimeter, at 25° C.

Example I

A jacketed reaction kettle provided with a suitable reflux condenser and a rotating stirrer is charged with a mixture of the following materials:

| | Parts by weight |
|---|---|
| Butadiene-1,3 | 70 |
| Styrene | 30 |
| "Lorol" mercaptan [1] | 0.5 |
| Water | 150 |
| Sodium salt of the formaldehyde condensation product of B-naphthalene sulfonic acid | 6 |
| Potassium persulphate | 1.0 |
| Potassium ferricyanide | 0.15 |
| NaOH | 0.25 |

[1] Trade name for the mercaptan obtained from the impure lauryl alcohol produced by reduction of cocoanut oils.

Stirring is commenced to emulsify the hydrocarbons in the water, and when an emulsion has been established steam is blown into the jacket at a rate which will raise the temperature of the charge to 50° C. over about 1½ hours to initiate the polymerization reaction. Thereafter, the temperature is maintained as nearly as is practicable at 50° C. Stirring is continued throughout the reaction. After 16 hours the charge is withdrawn from the kettle. The product is a stable dispersion containing approximately 37.5% solids by weight and having a viscosity of 4.5 centipoises.

Example II

The apparatus of Example I is charged with the following materials:

| | Parts by weight |
|---|---|
| Butadiene-1,3 | 70 |
| Styrene | 30 |
| Water | 60 |
| Sodium salt of the formaldehyde condensation product of B-naphthalene sulfonic acid | 5 |
| "Lorol" mercaptan | 0.5 |
| Potassium persulphate | 0.3 |
| Sodium oleate (pH-10) | 2.5 |

Stirring is begun and the temperature of the charge is raised over 1½ hours to 60° C. and thereafter held constant, as nearly as is practicable. Stirring is continued throughout the reaction. At the end of 20 hours the charge is removed from the reactor. The product is a stable, free-flowing dispersion containing about 59% solids by weight, and having a viscosity of 134 centipoises.

Example III

The apparatus is the same as in the preceding example and the charge is as follows:

| | Parts by weight |
|---|---|
| Butadiene-1,3 | 70 |
| Styrene | 30 |
| Water | 70.7 |
| Sodium salt of the formaldehyde condensation product of B-naphthalene sulfonic acid | 5 |
| "Lorol" mercaptan | .5 |
| Potassium persulphate | 0.3 |
| NaOH | 0.05 |

Stirring is begun and the temperature of the charge raised over 1½ hours to 60° C. and thereafter held as nearly as practicable at that temperature. Stirring is continued throughout the reaction. At the end of approximately 20 hours the charge is removed from the reactor. The product is a stable free-flowing dispersion containing about 57% solids by weight, and having a viscosity of 27 centipoises.

Example IV

The apparatus is the same as in the preceding example and the charge is as follows:

| | Parts by weight |
|---|---|
| Butadiene-1,3 | 50 |
| Styrene | 50 |
| Water | 70 |
| Sodium salt of the formaldehyde condensation product of B-naphthalene sulfonic acid | 5 |
| Sodium oleate | 4 |
| "Lorol" mercaptan | 0.25 |
| Potassium persulphate | 0.3 |

Stirring is begun and the temperature of the charge raised over 1½ hours to 60° C. and thereafter held as nearly as practicable at that temperature. Stirring is continued throughout the reaction. At the end of approximately 13 hours the charge is removed from the reactor. The product is a stable free-flowing dispersion containing about 57% solids by weight, and having a viscosity of 57 centipoises.

Example V

| | Parts by weight |
|---|---|
| Butadiene-1,3 | 30 |
| Styrene | 70 |
| Water | 73 |
| Sodium oleate | 4 |
| Sodium salt of the formaldehyde condensation product of B-naphthalene sulfonic acid | 5 |
| "Lorol" mercaptan | 0.5 |
| Potassium persulphate | 0.3 |

Stirring is begun and the temperature of the charge raised over 1½ hours to 60° C. and thereafter held as nearly as practicable at that temperature. Stirring is continued throughout the reaction. At the end of approximately 11 hours the charge is removed from the reactor. The product is a stable free-flowing dispersion containing about 57% solids by weight, and having a viscosity of 48 centipoises.

It will be observed from Example I that satisfactory polymer dispersions of a normal solids content may be made in accordance with the present invention without the use of soap. Consequently, the possibility is provided of carrying out the reaction at pH values within a wider range than has heretofore been possible. The addition agents of the present invention also provide the possibility of producing polymerized dispersions containing high proportions of solids. Soap may, if desired, be added to the reactor charge along with the addition agent of the present invention. In all cases the amount of soap required to produce the optimum beneficial effects is less than would be required were the addition agent not used.

The addition agent of the present invention may be added to the charge during the course of the reaction, rather than included as a part of the initial charge, and when so added will be effective to lower the viscosity of the completed dispersion and increase its stability. Lowering the viscosity in this manner will permit removal from the reactor and subsequent processing of dispersions of higher solids content than it would normally be possible to handle. It is preferred, however, that the addition agent be included in the initial charge for the reason that its beneficial effects are then available during the whole course of the reaction. To obtain a reduction in the amount of soap which is employed, the addition agent should be added early in the process.

The proportion of addition agent may vary over a considerable range. Even 0.25%, based on the weight of the monomers, produces an appreciable effect. We have obtained the best results with from 3% to 6% of addition agent, based on the weight of the monomer, when no fatty-acid soap or its equivalent is employed. Still larger proportions may be used, but with these larger amounts, the beneficial effects are generally not substantially greater and are thus not economically justifiable.

The addition agent of the present invention may be used satisfactorily in batches which contain other addition or modifying agents which are currently used for their special effects, such as mercaptan or other types of chain modifiers, activators of polymerization such as potassium ferricyanide, etc.

The use of the addition agents of the present invention permits the production of styrene-butadiene-1,3 synthetic rubber by coagulation which is completely soap-free initially and which consequently does not have to be treated to remove from it fatty acids or insoluble soaps formed by reaction with the coagulant. At the same time, the addition agent itself is water soluble and will therefore be readily removed from the rubber coagulated from the polymerized dispersion by the washing treatment to which the coagulum is subjected in the normal course of processing. If it is desired for one reason or another to employ soap in the process, it is possible to use less than the amount which has heretofore been considered the minimum, without appreciable adverse effect on the course or duration of the reaction. The addition agents at the same time provide the possibility of making a stable polymerized dispersion of high solids content and low viscosity under established plant-scale conditions.

It has been found that test specimens cut from dried films deposited from polymerized butadiene-styrene dispersions produced by the present process without the use of soap show improved physical properties including a markedly greater tensile strength and better ageing than films from similar dispersions made without the use of the addition agents of the present invention. The reasons for this are not clearly understood at the present time.

It is apparent that many widely different variations of the particular procedures and compounds described in detail above for the purpose of illustration may be employed without departure from the spirit of the invention. Accordingly, the following claim is to be so construed as to include such modifications.

We claim:

The process which comprises emulsifying a mixture of butadiene-1,3 and styrene in proportions to produce a rubbery copolymer in water in the presence of 5% of an emulsifying agent based on the weight of the monomers, said emulsifying agent consisting of a water-soluble salt selected from the group consisting of sodium, potassium and ammonium salts of a water-soluble condensation product of naphthalene sulfonic acid, and polymerizing with a polymerization catalyst until there is produced a stable, free-flowing dispersion having about 57% solids by weight, and having a viscosity of 27 centipoises measured on a Stormer type viscosimeter at 25° C.

JACOB G. MARK.
DAVID RUBINSTEIN.

REFERENCES CITED

The following references are of record in the file of this patent:

UNITED STATES PATENTS

| Number | Name | Date |
|---|---|---|
| 2,356,091 | Roedel | Aug. 15, 1944 |
| 1,938,730 | Tschunkur et al. | Dec. 12, 1933 |
| 2,161,949 | Calcott | June 13, 1939 |
| 2,046,757 | Tucker | July 7, 1936 |
| 2,382,684 | Walker | Aug. 14, 1945 |
| 2,371,722 | Wanderer | Mar. 20, 1945 |
| 2,385,739 | Starkweather | Sept. 25, 1945 |

Ser. No. 362,608, Bachle et al. (A. P. C.) pub. Apr. 20, 1943.

FOREIGN PATENTS

| Number | Country | Date |
|---|---|---|
| 550,280 | British | Jan. 1, 1943 |

OTHER REFERENCES

Vanderbilt News, pp. 4, 5 and 6, Sept.-Oct. 1934. (Cpg. in Div. 50.)